United States Patent
Kim et al.

(10) Patent No.: US 10,341,888 B2
(45) Date of Patent: Jul. 2, 2019

(54) METHOD AND DEVICE FOR SELECTIVELY PERFORMING DRS MEASUREMENT OR CRS MEASUREMENT

(71) Applicant: LG ELECTRONICS INC., Seoul (KR)

(72) Inventors: Sangwon Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/517,423

(22) PCT Filed: Sep. 14, 2015

(86) PCT No.: PCT/KR2015/009599
§ 371 (c)(1),
(2) Date: Apr. 6, 2017

(87) PCT Pub. No.: WO2016/056761
PCT Pub. Date: Apr. 14, 2016

(65) Prior Publication Data
US 2017/0303152 A1    Oct. 19, 2017

Related U.S. Application Data

(60) Provisional application No. 62/060,994, filed on Oct. 7, 2014.

(51) Int. Cl.
*H04L 5/00* (2006.01)
*H04W 24/08* (2009.01)
(Continued)

(52) U.S. Cl.
CPC .............. *H04W 24/08* (2013.01); *H04J 11/00* (2013.01); *H04L 5/005* (2013.01); *H04L 5/0048* (2013.01); *H04W 48/16* (2013.01); *H04L 5/0091* (2013.01)

(58) Field of Classification Search
CPC ........ H04J 11/00; H04L 5/0048; H04L 5/005; H04L 5/0091; H04W 24/08; H04W 48/16
(Continued)

(56) References Cited

U.S. PATENT DOCUMENTS

2015/0092768 A1\* 4/2015 Ng .................. H04W 48/16
370/350

OTHER PUBLICATIONS

3GPP TS 36.211 V10.4.0 (Dec. 2011), 3rd Generation Partnership Project; Technical Specification Group Radio Access Network; Evolved Universal Terrestrial Radio Access (E-UTRA); Physical Channels and Modulation (Release 10), 101 Pages.
(Continued)

*Primary Examiner* — Melvin C Marcelo
*Assistant Examiner* — Natali Pascual Peguero
(74) *Attorney, Agent, or Firm* — Birch, Stewart, Kolasch & Birch, LLP

(57) ABSTRACT

A method by which a terminal performs cell measurement by selectively using reference signals (RSs) is provided. The terminal receives, from a network, a common RS (CRS) measurement configuration and a discovery RS (DRS) measurement configuration with respect to a frequency to be measured. If the network has configured a physical cell ID (PCID) list for CRS-based DRS measurement with respect to the frequency to be measured, DRS measurement is performed on cells included in the PCID list, and CRS measurement is performed on cells not included in the PCID list. If the network has not configured the PCID list for CRS-based DRS measurement with respect to the frequency to be measured, DRS measurement is performed on all cells belonging to the frequency to be measured.

12 Claims, 12 Drawing Sheets

(51) Int. Cl.
*H04W 48/16* (2009.01)
*H04J 11/00* (2006.01)

(58) Field of Classification Search
USPC .................................................. 370/252, 350
See application file for complete search history.

(56) References Cited

OTHER PUBLICATIONS

CMCC, "Discussion on air-interface based small cell synchronization", R1-133524, 3GPP TSG RAN WG1 Meeting #74, Barcelona, Spain, Aug. 19-23, 2013, See pp. 1-4.
Huawei et al., "Small cell on/off transition time reduction", R1-140037, 3GPP TSG RAN WG1 Meeting #76, Prague, Czech Republic, Feb. 10-14, 2014, See pp. 1-3.
Mazzarese, "LS on agreements on small cell discovery", R1-143610, 3GPP TSG RAN WG1 Meeting #78, Dresden, Germany, Aug. 18-22, 2014, See pp. 1-2.
Mediatek Inc., "Performance Evaluation for Small Cell Discovery Using Legacy Schemes", R1-132280, 3GPP TSG-RAN WG1 #73, Fukuoka, Japan, May 20-24, 2013, See pp. 1-2.
Nokia Networks et al., "On detailed design of Discovery Signals", R1-143243, 3GPP TSG-RAN WG1 Meeting #78, Dresden, Germany, Aug. 18-22, 2014, See pp. 1-4.
Section 6.10.1. of 3GPP TS 36.211 V10.1.0 (Mar. 2011); 3rd Generation Partnership Project; Technical Specification Group Radio Access Network; Evolved Universal Terrestrial Radio Access (E-UTRA); Physical Channels and Modulation (Release 10), 6 Pages.
Section 6.10.3. of 3GPP TS 36.211 V10.1.0 (Mar. 2011); 3rd Generation Partnership Project; Technical Specification Group Radio Access Network; Evolved Universal Terrestrial Radio Access (E-UTRA); Physical Channels and Modulation (Release 10), 8 Pages.
Section 6.10.5. of 3GPP TS 36.211 V10.1.0 (Mar. 2011); 3rd Generation Partnership Project; Technical Specification Group Radio Access Network; Evolved Universal Terrestrial Radio Access (E-UTRA); Physical Channels and Modulation (Release 10), 7 Pages.

* cited by examiner

METHOD AND DEVICE FOR SELECTIVELY PERFORMING DRS MEASUREMENT OR CRS MEASUREMENT

CROSS REFERENCE TO RELATED APPLICATIONS

This application is the National Phase of PCT International Application No. PCT/KR2015/009599, filed on Sep. 14, 2015, which claims priority under 35 U.S.C. 119(e) to U.S. Provisional Application No. 62/060,994, filed on Oct. 7, 2014, all of which are hereby expressly incorporated by reference into the present application.

BACKGROUND OF THE INVENTION

Field of the Invention

The present invention relates to a wireless communication system, and more particularly, to a method and a device for selectively performing discovery reference signal (DRS) measurement or common reference signal (CRS) measurement in a frequency configured for DRS measurement and CRS measurement.

Related Art

3rd Generation Partnership Project (3GPP) Long Term Evolution (LTE) that is an advancement of the Universal Mobile Telecommunication System (UMTS) is introduced as 3GPP Release 8. 3GPP LTE uses orthogonal frequency division multiple access (OFDMA) in a downlink, and uses single carrier-frequency division multiple access (SC-FDMA) in an uplink.

LTE is divided into a frequency division duplex (FDD) mode and a time division duplex (TDD) mode.

As set forth in 3GPP TS 36.211 V10.4.0 (2011-12) "Evolved Universal Terrestrial Radio Access (E-UTRA); Physical Channels and Modulation (Release 10)," physical channels in LTE may be classified into downlink channels, such as physical downlink shared channel (PDSCH) and physical downlink control channel (PDCCH), and uplink channels, such as physical uplink shared channel (PUSCH) and physical uplink control channel (PDCCH).

Meanwhile, a wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

SUMMARY OF THE INVENTION

The present invention proposes a method and a device for a user equipment (UE) to perform cell measurement selectively using a downlink reference signal in a wireless communication system. The UE may receive a common reference signal (CRS) measurement configuration and a discovery reference signal (DRS) measurement configuration from a network.

The UE may determine whether the network configures a physical cell ID (PCID) list with respect to a measurement object frequency, and may perform cell measurement based on the PCID list when the PCID list is configured. Specifically, the UE may perform CRS-based DRS measurement on a cell included in the PCID list, and may perform CRS measurement on a cell not included in the PCID list. When no PCID is configured, the UE may CRS-based DRS measurement on all cells.

One embodiment provides a method in which a UE performs cell measurement selectively using a reference signal (RS).

The UE may receive a CRS measurement configuration and a DRS measurement configuration for a measurement object frequency from a network; and may perform DRS measurement for a cell comprised in a physical cell identification (PCID) list, and may perform CRS measurement for a cell not comprised in the PCID list, if the network configures the PCID list for CRS-based DRS measurement for the measurement object frequency.

The UE may perform DRS measurement for all cells belonging to the measurement object frequency, if the network does not configure the PCID list for CRS-based DRS measurement for the measurement object frequency.

The DRS measurement may be CRS-based DRS measurement.

The CRS measurement may be CRS-based radio resource management (RRM) measurement.

The DRS measurement configuration may further include a CSI-RS-based DRS measurement configuration.

When a PCID list of a transmission point is configured in the CSI-RS-based DRS measurement configuration, CSI-RS-based DRS measurement may be performed in a cell comprised in the PCID list of the transmission point.

When a CSI-RS resource ID list is configured in the CSI-RS-based DRS measurement configuration, CSI-RS-based DRS measurement may be performed in a cell comprised in the CSI-RS resource ID list.

Another embodiment provides a UE for performing cell measurement selectively using an RS.

The UE may include: a memory; a transceiver; and a processor configured to connect the memory and the transceiver, wherein the processor may be configured to: control the transceiver to receive a CRS measurement configuration and a DRS measurement configuration for a measurement object frequency from a network; and perform DRS measurement for a cell comprised in a PCID list, and perform CRS measurement for a cell not comprised in the PCID list, if the network configures the PCID list for CRS-based DRS measurement for the measurement object frequency.

The processor may be configured to perform DRS measurement for all cells belonging to the measurement object frequency, if the network does not configure the PCID list for CRS-based DRS measurement for the measurement object frequency.

The DRS measurement configuration may further include a CSI-RS-based DRS measurement configuration.

When a PCID list of a transmission point is configured in the CSI-RS-based DRS measurement configuration, the processor may be configured to perform CSI-RS-based DRS measurement in a cell comprised in the PCID list of the transmission point.

When a CSI-RS resource ID list is configured in the CSI-RS-based DRS measurement configuration, the processor may be configured to perform CSI-RS-based DRS measurement in a cell comprised in the CSI-RS resource ID list.

DRS measurement may be performed for a DRS measurement-configured cell, instead of CRS measurement.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
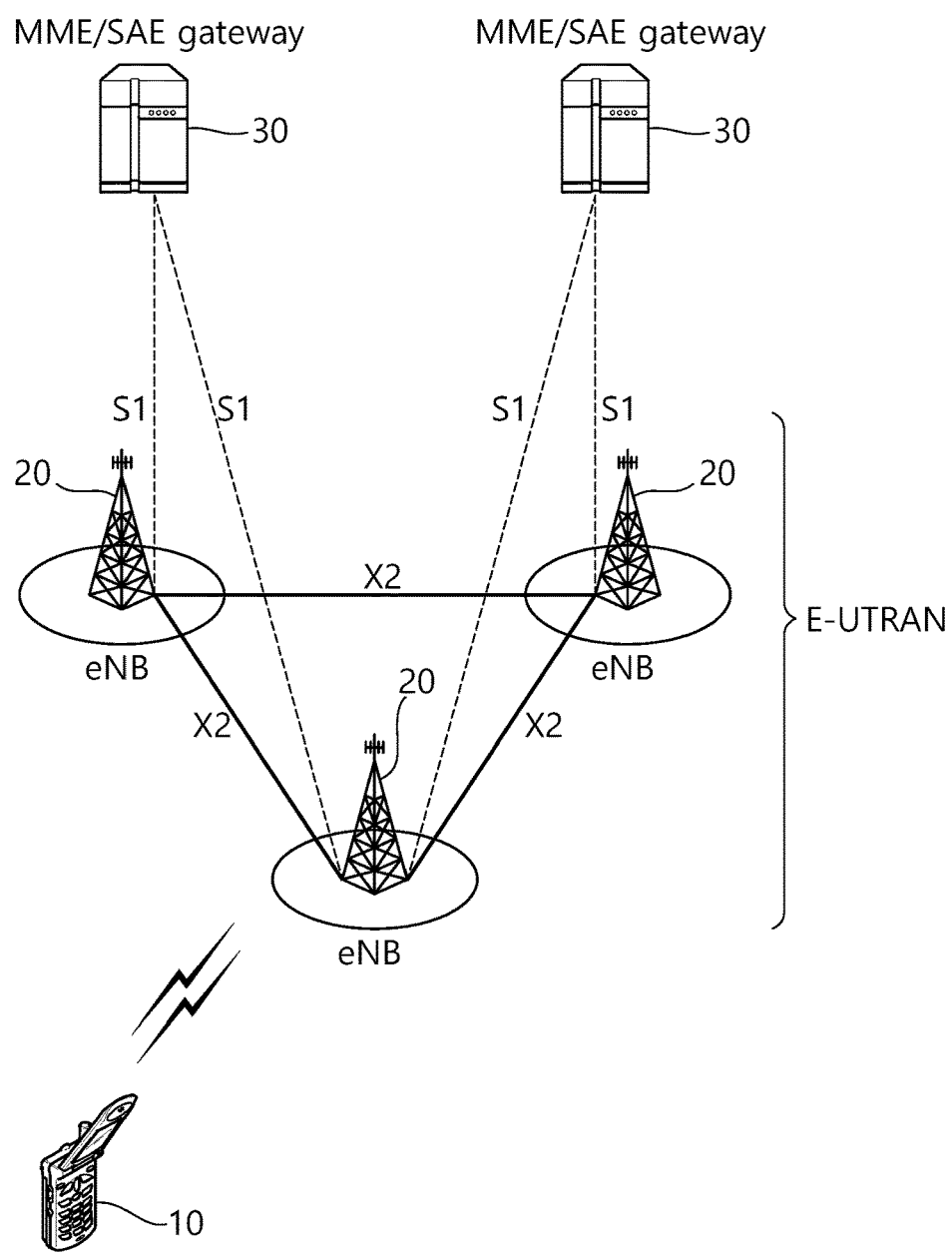
FIG. 1 shows LTE system architecture.

FIG. 1 shows LTE system architecture. The communication network is widely deployed to provide a variety of communication services such as voice over interne protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
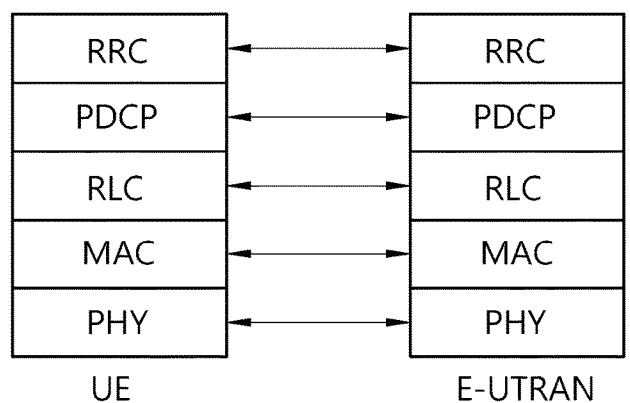
FIG. 2 shows a control plane of a radio interface protocol of an LTE system.
Figure 3:
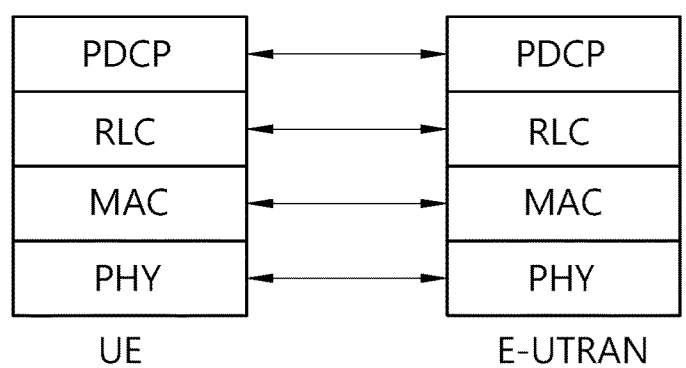
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
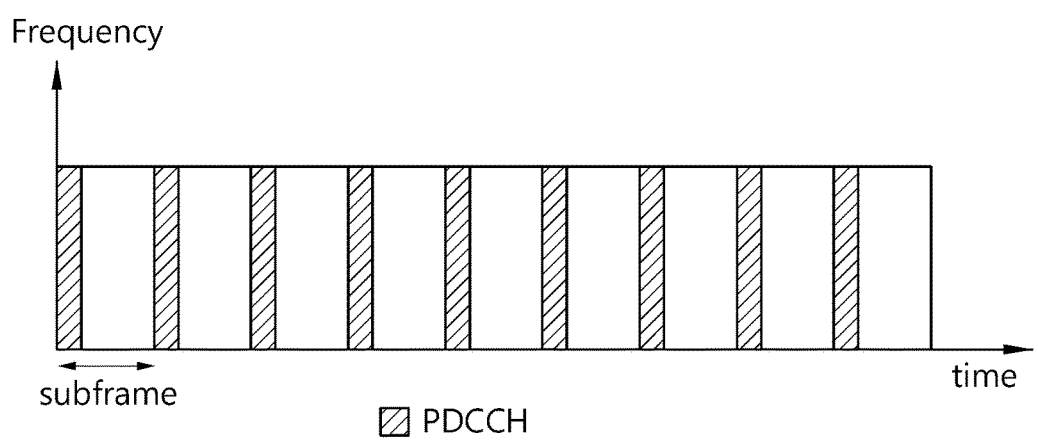
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Figure 5:
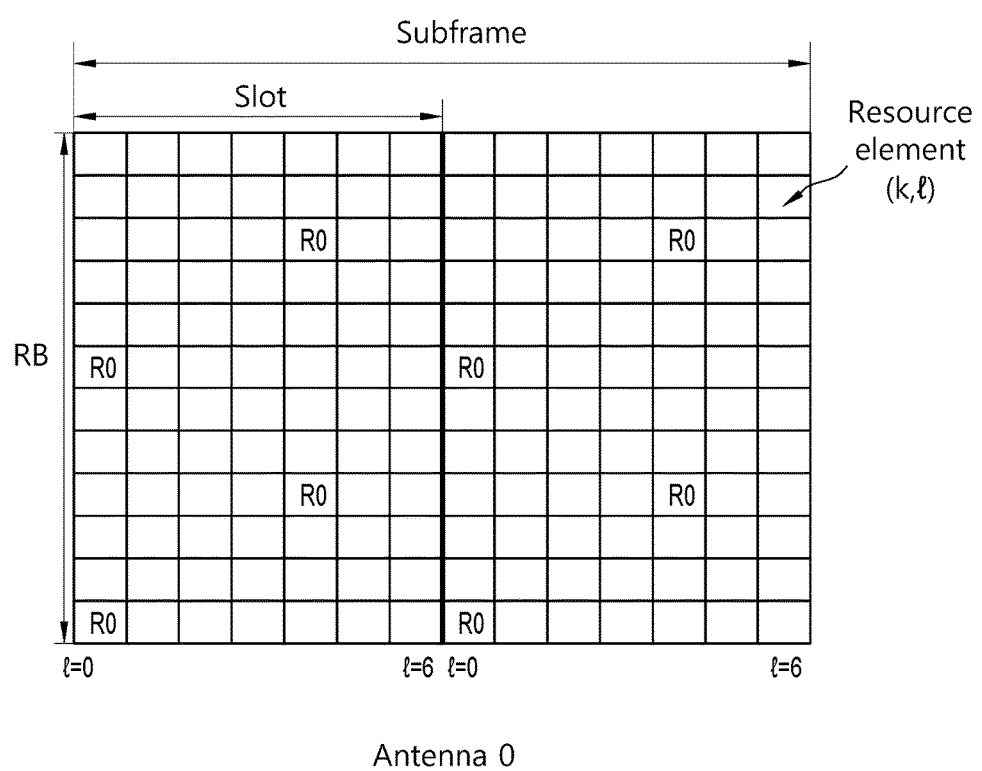
FIGS. 5 to 7 illustrate examples of an RB to which a CRS is mapped.
Figure 6:
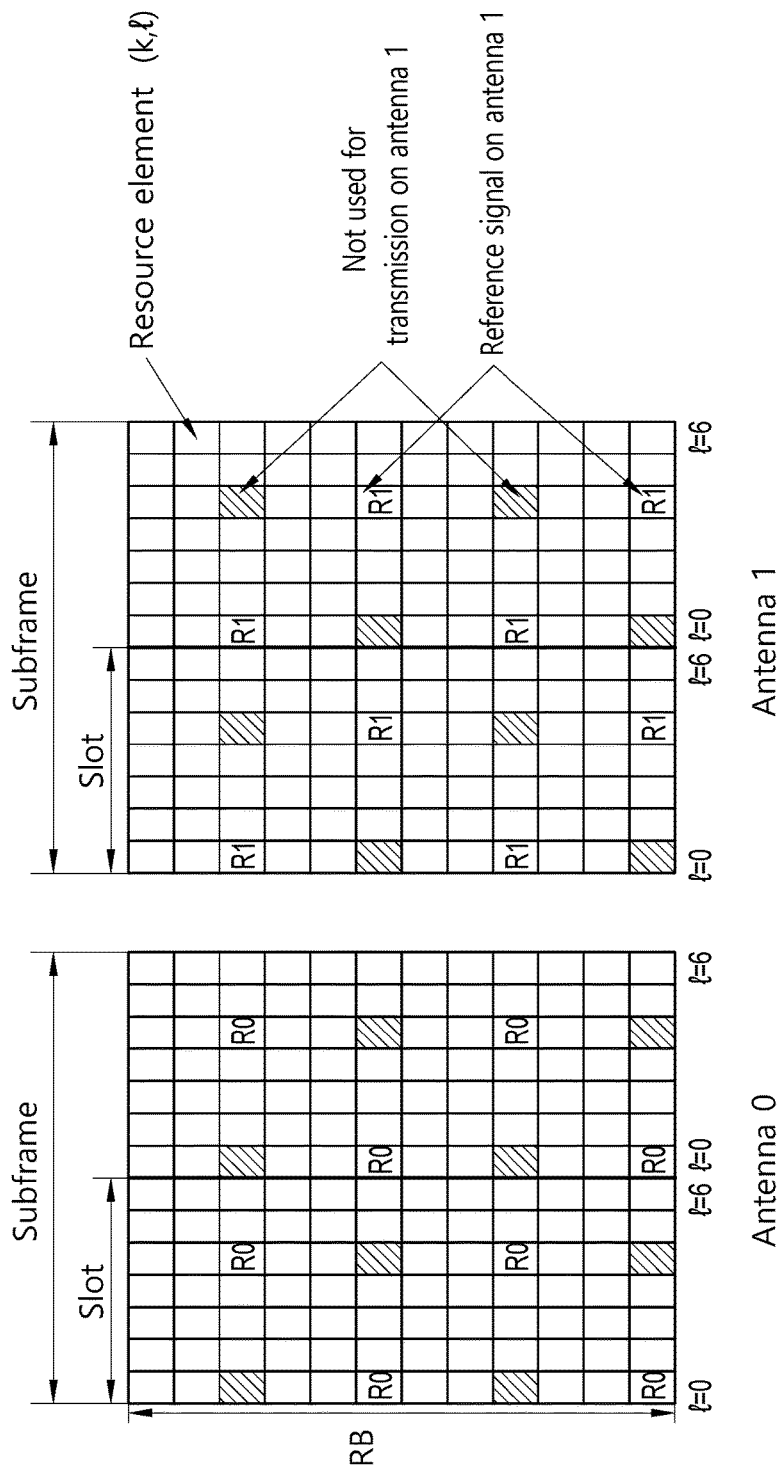
Figure 7:
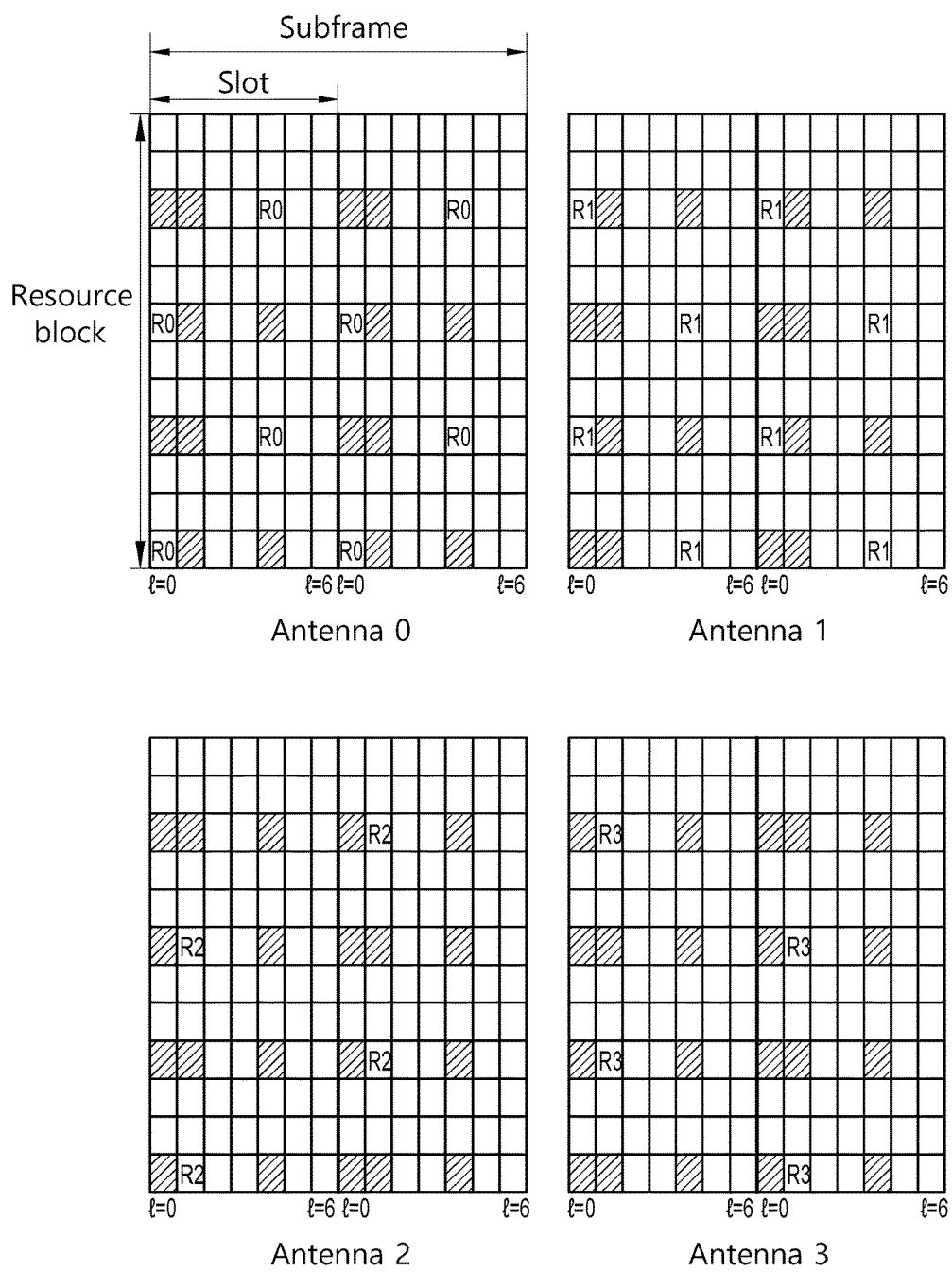

FIGS. 5 to 7 illustrate examples of an RB to which a CRS is mapped.

FIG. 5 shows one example of a pattern in which a CRS is mapped to an RB when a BS uses a single antenna port. FIG. 6 shows one example of a pattern in which a CRS is mapped to an RB when a BS uses two antenna ports. FIG. 7 shows one example of a pattern in which a CRS is mapped to an RB when a BS uses four antenna ports. The CRS patterns may be used to support features of LTE-A. For example, the CRS patterns may be used to support features of coordinated multi-point (CoMP) transmission/reception technique or spatial multiplexing. Also, a CRS may be used for channel quality measurement, CP detection, time/frequency synchronization, or the like.

Referring to FIGS. 5 to 7, when a BS performs multi-antenna transmission using a plurality of antenna ports, one resource grid is allocated to each antenna port. 'R0' represents a reference signal for a first antenna port; 'R1' represents a reference signal for a second antenna port; 'R2' represents a reference signal for a third antenna port; and 'R3' represents a reference signal for a fourth antenna port. The positions of R0 to R3 in a subframe do not overlap with each other. l represents the position of an OFDM symbol in a slot and has a value ranging from 0 to 6 in a normal CP. In one OFDM symbol, a reference signal for each antenna port is placed at an interval of six subcarriers. The number of R0s and the number of R1s in a subframe are the same, and the number of R2s and the number of R3s are the same. The numbers of R2s and R3s in a subframe are smaller than the numbers of R0s and R1s. A resource element used for a reference signal of one antenna port is not used for a reference signal of another antenna port, which is to avoid causing interference between antenna ports.

CRSs are always transmitted as many as the number of antenna ports regardless of the number of streams. A CRS is a separate reference signal for each antenna port. The frequency-domain position and time-domain position of the CRS in a subframe are determined regardless of UEs. A CRS sequence by which the CRS is multiplied is also generated regardless of UEs. Therefore, all UEs within a cell may receive the CRS. However, the positions of the CRS within the subframe and the CRS sequence may be determined according to a cell ID. The time-domain position of the CRS in the subframe may be determined according to an antenna port number and the number of OFDM symbols in a resource block. The frequency-domain position of the CRS in the subframe may be determined according to an antenna port number, cell ID, OFDM symbol index (1), a slot number in a radio frame, or the like.

A two-dimensional CRS sequence may be generated by multiplying symbols of a two-dimensional orthogonal sequence and symbols of a two-dimensional pseudo-random sequence. There may be three different two-dimensional orthogonal sequences and 170 different two-dimensional pseudo-random sequences. Each cell ID corresponds to a unique combination of one orthogonal sequence and one pseudo-random sequence. In addition, frequency hopping may be applied to a CRS. A frequency hopping pattern may have a period of one radio frame (10 ms), and each frequency hopping pattern corresponds to one cell ID group.

A UE-specific RS is supported for PDSCH transmission, and is transmitted on antenna port p=5, p=8 or p=7, 8, . . . , v+6. Here, v represents the number of layers used for PDSCH transmission. The UE-specific RS is transmitted to one UE through any of the antenna ports belonging to set S, where S={7, 8, 11, 13} or S={9, 10, 12, 14}. The UE-specific RS is defined for PDSCH demodulation and is valid only when PDSCH transmission is associated with the corresponding antenna port. The UE-specific RS is transmitted only on an RB to which the corresponding PDSCH is mapped. The UE-specific RS is not transmitted in a resource element in which any one of a physical channel and a physical signal is transmitted, regardless of antenna ports. The UE-specific RS is disclosed in Section 6.10.3 of 3GPP TS 36.211 V10.1.0 (2011-03).

Figure 8:
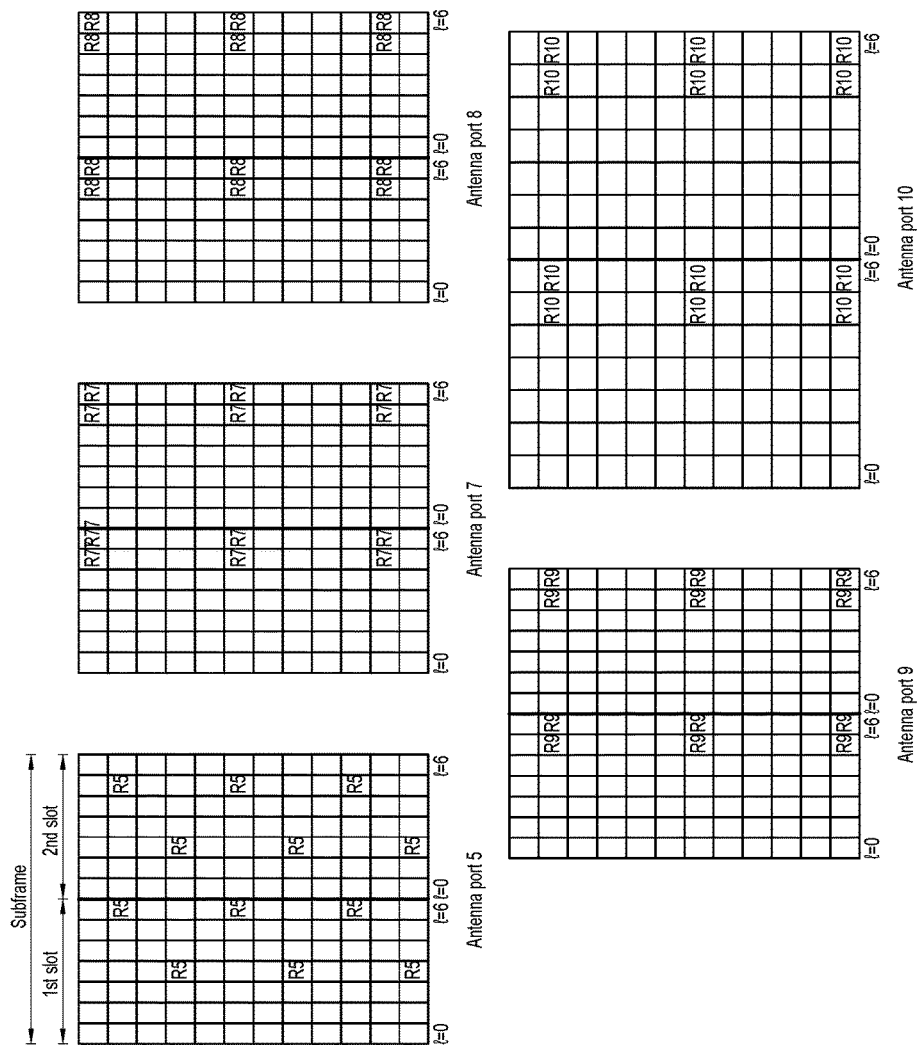
FIG. 8 illustrates an example of an RB to which a UE-specific RS is mapped.

FIG. 8 illustrates an example of an RB to which a UE-specific RS is mapped.

FIG. 8 shows resource elements used for a UE-specific RS in a normal CP structure. Rp denotes a resource element used for UE-specific RS transmission on antenna port p. For example, R5 denotes a resource element used for UE-specific RS transmission on antenna port 5. Referring to FIG. 8, UE-specific RSs for antenna port 7 and 8 are transmitted through resource elements corresponding to first, sixth, and eleventh subcarriers (subcarrier index 0, 5, and 10) of sixth and seventh OFDM symbols (OFDM symbol index 5 and 6) of each slot. The UE-specific RSs for antenna port 7 and 8 may be identified by an orthogonal sequence of length 2. UE-specific RSs for antenna port 9 and 10 are transmitted through resource elements corresponding to second, seventh, and twelfth subcarriers (subcarrier index 1, 6, and 11) of sixth and seventh OFDM symbols (OFDM symbol index 5 and 6) of each slot. The UE-specific RSs for antenna port 9 and 10 may be identified by an orthogonal sequence of length 2. Since S={7, 8, 11, 13} or S={9, 10, 12, 14}, UE-specific RSs for antenna port 11 and 13 are mapped to the resource elements to which the UE-specific RSs for antenna port 7 and 8 are mapped, while the UE-specific RSs for antenna port 12 and 14 are mapped to the resource elements to which the UE-specific RSs for antenna port 9 and 10 are mapped.

A CSI RS is transmitted through one, two, four, or eight antenna ports. The antenna ports used for each case is p=15, p=15, 16, p=15, . . . , 18, and p=15, . . . , 22, respectively. The CSI RS may be defined only for $\Delta f=15$ kHz. The CSI RS is disclosed in Section 6.10.5 of 3GPP TS 36.211 V10.1.0 (2011-03).

A CSI RS sequence may be based on a pseudo-random sequence generated in a cell ID-based seed. In the transmission of a CSI-RS, up to 32 different configurations may be proposed to reduce inter-cell interference (ICI) in a multi-cell environment including a heterogeneous network (Het-Net) environment. A CSI-RS configuration varies according to the number of antenna ports in a cell and CP, and neighboring cells may have the most different configurations. Also, a CSI-RS configuration may be divided depending on a frame structure into a type applied to both an FDD frame and a TDD frame and a type applied only to a TDD frame.

Figure 9:
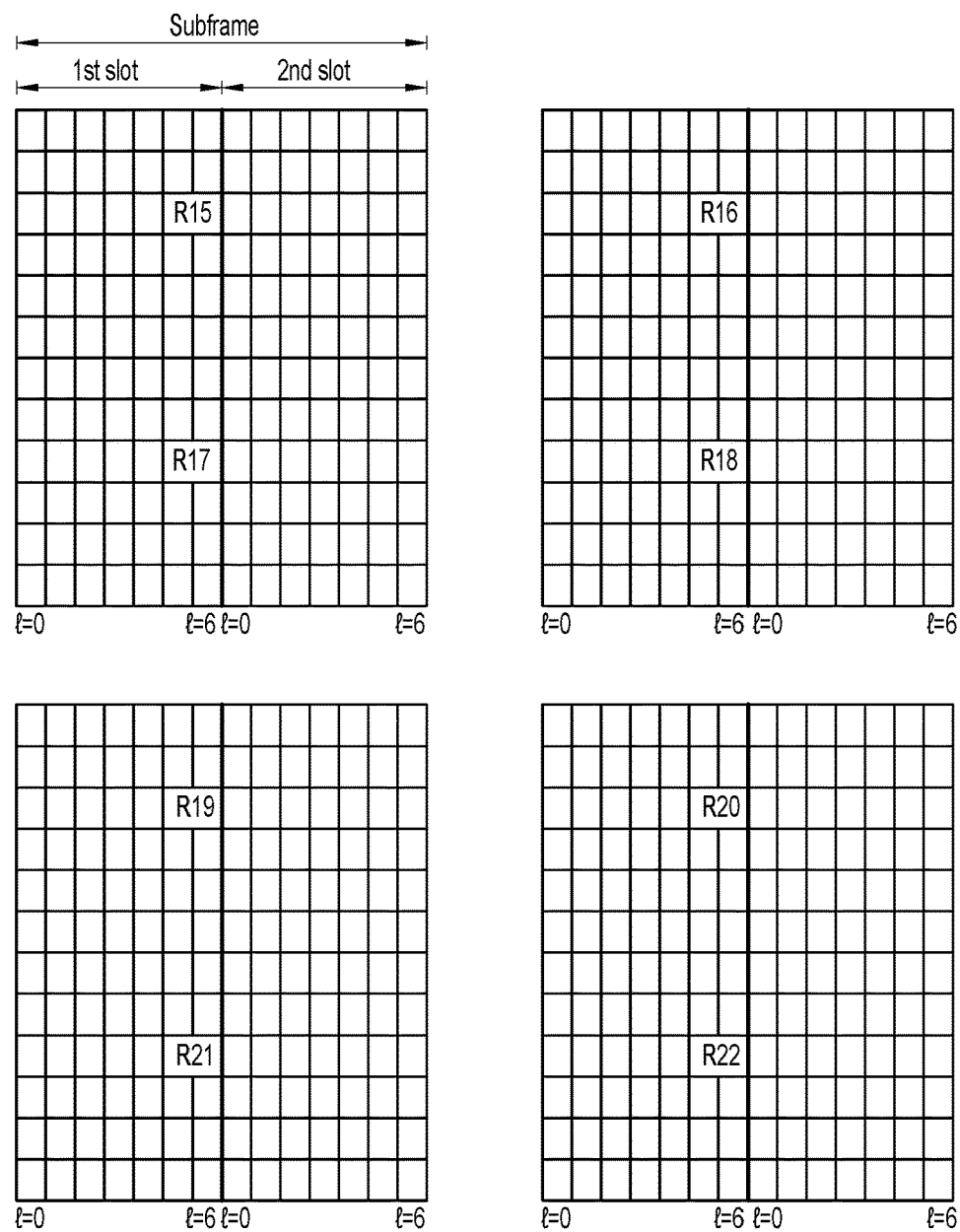
FIG. 9 illustrates an example of an RB to which a CSI RS is mapped.

FIG. 9 illustrates an example of an RB to which a CSI RS is mapped.

FIG. 9 shows resource elements used for a CSI RS when a CSI RS configuration index is 0 in a normal CP structure. Rp denotes a resource element used for CSI RS transmission on antenna port p. Referring to FIG. 9, CSI RSs for antenna port 15 and 16 are transmitted through resource elements corresponding to third subcarriers (subcarrier index 2) of sixth and seventh OFDM symbols (OFDM symbol index 5 and 6) of a first slot. CSI RSs for antenna port 17 and 18 are transmitted through resource elements corresponding to ninth subcarriers (subcarrier index 8) of the sixth and seventh OFDM symbols (OFDM symbol index 5 and 6) of the first slot. CSI RSs for antenna port 19 and 20 are transmitted through the resource elements through which the CSI RSs for the antenna port 15 and 16 are transmitted, while the CSI RSs for antenna port 21 and 22 are transmitted through the resource elements through which the CSI RSs for antenna port 17 and 18 are transmitted.

Hereinafter, a discovery reference signal (DRS) is described.

A microcell, a femtocell, and a picocell, which have small service coverage, may be installed at specified locations within the coverage of a macrocell with wide coverage. Such cells may be referred to as small cells. A small cell cluster is a set of geographically adjacent small cells. In most cases, one or two clusters are located in one macrocell (or sector) to provide high traffic for a UE.

To adjust inter-cell interference, the states of some small cells belonging to a small cell cluster may be changed (on/off) per appropriate time (dozens of milliseconds (ms)), thus performing inter-cell traffic load balancing. To reduce time to change the states of the small cells, even a turned-off small cell may transmit some signals (for example, a CRS or CSI RS) according a low period (for example, 40 ms) so that a UE may perform radio resource management (RRM) measurement regardless of the states of the small cells. That is, in order to increase downlink traffic, the on/off states of the small cells belonging to the small cell cluster may be changed. An off-state small cell, which has an increase in traffic load, quickly may need to change to an on state, while an on-state small cell, which hays a low traffic load, may need to change to an off state. A method in which a small cell hands over the traffic loads of serving UEs to a neighboring small cell in the on state and changes to the off state may be considered. Since the small cell is in the off state, the neighboring small cell has a reduced level of interference, thus indirectly resulting in the effect of increasing downlink traffic.

An on-state small cell may transmit a control channel (for example, a PDCCH), a pilot (for example, a CRS or UE-specific RS), and data per subframe. It is preferable that an off-state small cell transmits no signal in view of interference management. However, when the state of a small cell is changed rapidly enough to quickly respond to a traffic load change, downlink traffic may be rather increased if no signal is transmitted. Thus, an off-state small cell transmits a minimal signal to quickly change to the on state. The minimal signal is newly introduced in Rel-12 and may be referred to as a DRS (discovery signal).

A DRS introduced in Rel-12 is configured using a combination of a Rel-8 primary synchronization signal (PSS), a Rel-8 secondary synchronization signal (SSS), and Rel-8 CRS port 0. If necessary, Rel-10 CSI-RS port 15 may be additionally configured. A UE may obtain coarse time synchronization and frequency synchronization with a small cell from the small cell through the PSS and the SSS. The UE may obtain accurate time synchronization and frequency synchronization using CRS port 0. If a DRS is configured using a CRS only, the UE may perform RRM measurement using the CRS only. If a CSI-RS is additionally used to configure a DRS, the UE may perform RRM measurement using only the CSI-RS based on synchronization obtained using a PSS/SSS/CRS.

A small cell may transmit a DRS regardless of the on state or off state. The DRS is transmitted to change the state of the small cell, and a quick state change of the small cell is greatly useful in view of interference management in a small cell cluster. When adjacent small cells transmit DRSs in sync, a UE receiving the DRSs may perform intra-frequency/inter-frequency RRM measurement with less battery consumption.

When a UE performs cell measurement, if all cells of a specified frequency surrounding the UE support a DRS, the UE need not perform existing CRS measurement in the frequency. However, the UE always performs existing CRS measurement in a frequency currently supporting a DRS. The present invention proposes a method of selectively performing CRS measurement or DRS measurement in a DRS supporting frequency.

In the present invention, when configuring DRS measurement for a UE, a network may also configure a physical cell ID (PCID) for CRS-based DRS measurement. When the PCID list is configured, the UE may perform CRS-based DRS measurement for a cell included in the PCID list and may perform existing CRS measurement for a cell not included in the PCID list or all cells of a corresponding frequency. When no PCID list is configured, the UE may not perform CRS measurement for all cells. That is, when the network configures the PCID list for a frequency in which CRS measurement and DRS measurement are configured, the UE may perform CRS-based DRS measurement for a cell included in the PCID list and may perform CRS measurement for a cell not included in the PCID list or all cells of the corresponding frequency. When the network configures no PCID list, the UE may perform CRS-based DRS measurement for all cells. The CRS measurement is existing CRS-based RRM measurement.

In addition, when a DRS measurement configuration includes a CSI-RS-based DRS measurement configuration and a PCID list of a target transmission point in which CSI-RS-based DRS measurement is performed or a corresponding CSI-RS resource ID list is also configured, the UE may perform CSI-RS-based DRS measurement for a transmission point included in the list.

Figure 10:
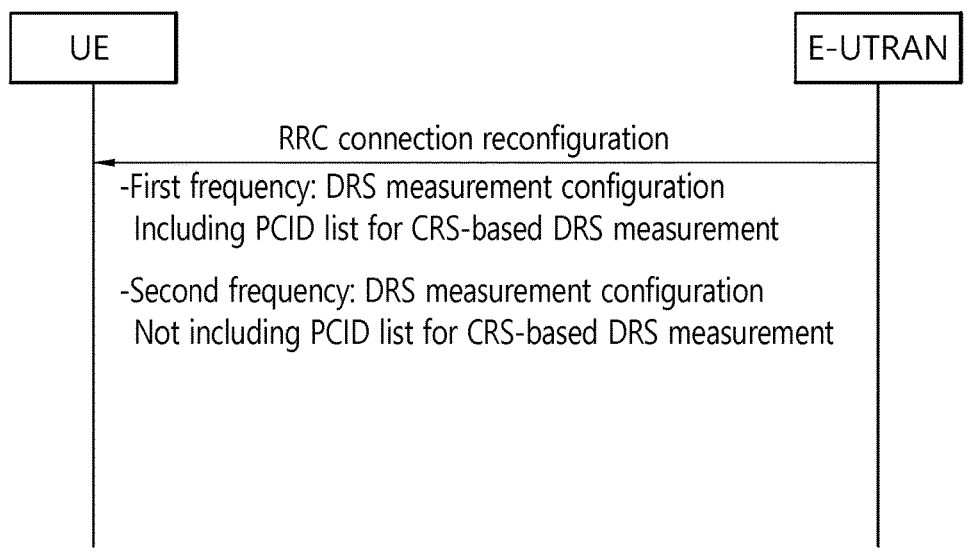
FIG. 10 illustrates a method in which a UE performs cell measurement selectively using an RS according to one embodiment of the present invention.

FIG. 10 illustrates a method in which a UE performs cell measurement selectively using an RS according to one embodiment of the present invention.

It is assumed in the present embodiment that a first frequency and a second frequency are configured as measurement objects and DRS measurement is configured in both the first frequency and the second frequency. Further, it is assumed that a PCID list for CRS-based DRS measurement is also configured in a DRS measurement configuration for the first frequency, while no PCID list for CRS-based DRS measurement is configured in a DRS measurement configuration for the second frequency.

Referring to FIG. 10, the UE receives a CRS measurement configuration and a DRS measurement configuration from a network. In the first frequency in which the PCID list is configured, the UE may perform CRS-based DRS measurement for cells corresponding to the PCID list and may perform CRS measurement for other cells not corresponding to the PCID list. In the second frequency in which no PCID list is configured, the UE may perform CRS-based DRS measurement for all cells. That is, the UE may not perform CRS measurement.

Figure 11:
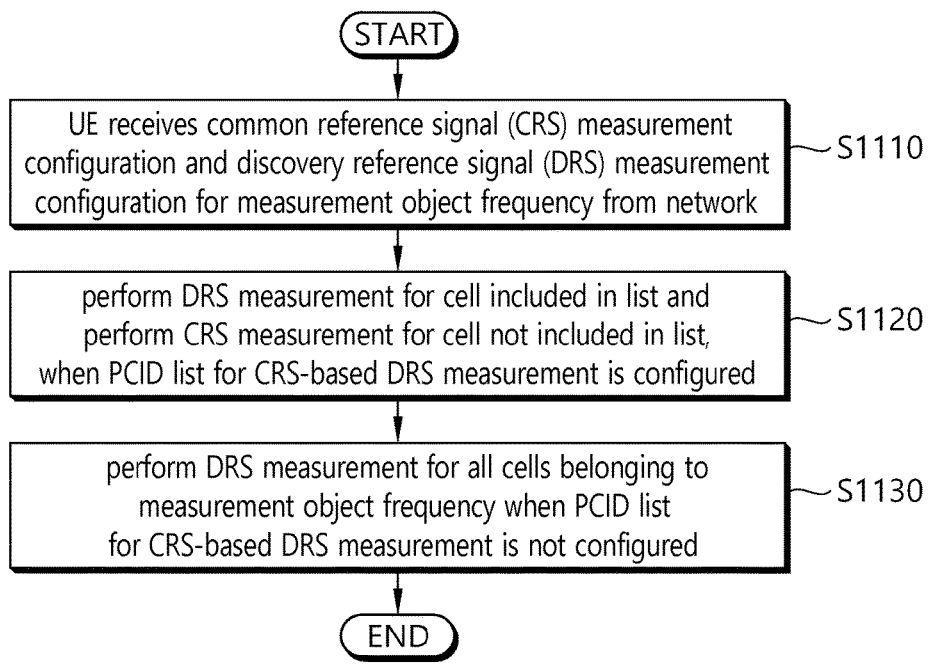
FIG. 11 is a block diagram illustrating a method in which a UE performs cell measurement selectively using an RS according to one embodiment of the present invention.

FIG. 11 is a block diagram illustrating a method in which a UE performs cell measurement selectively using an RS according to one embodiment of the present invention.

The UE may receive a CRS measurement configuration and a DRS measurement configuration for a measurement object frequency from a network (S1110). When a PCID list for CRS-based DRS measurement is configured for the measurement object frequency, the UE may perform CRS-based DRS measurement for a cell included in the list and may perform CRS measurement for a cell not included in the list (S1120). When a PCID list for CRS-based DRS measurement is not configured for the measurement object frequency, the UE may perform CRS-based DRS measurement for all cells belonging to the measurement object frequency (S1130).

Figure 12:
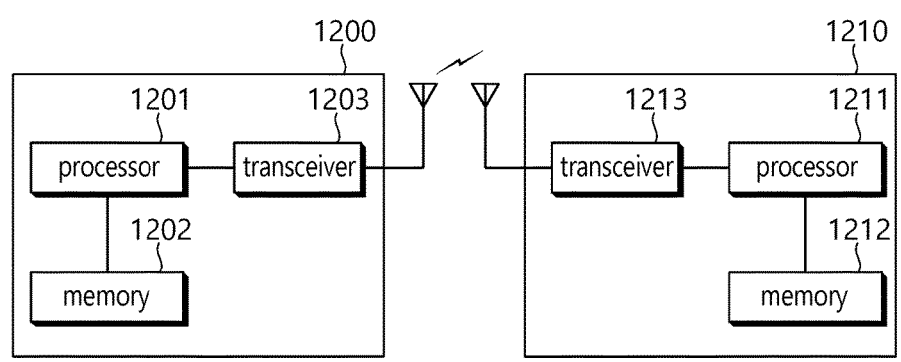
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), a discovery reference signal (DRS) measurement or a common reference signal (CRS) measurement, the method comprising:
   receiving a CRS measurement configuration and a DRS measurement configuration for a measurement object frequency, from a network;
   if the DRS measurement configuration includes a physical cell identification (PCID) list for a CRS-based DRS measurement,
      performing the DRS measurement for at least one cell included in the PCID list, and
      performing the CRS measurement for at least one cell not included in the PCID list; and
   if the DRS measurement configuration does not include the PCID list for the CRS-based DRS measurement,
      performing the DRS measurement for all cells belonging to the measurement object frequency.

2. The method of claim 1, wherein the DRS measurement is the CRS-based DRS measurement.

3. The method of claim 1, wherein the CRS measurement is a CRS-based radio resource management (RRM) measurement.

4. The method of claim 1, wherein the DRS measurement configuration further includes a channel state information (CSI)-reference signal (RS)-based (CSI-RS-based) DRS measurement configuration.

5. The method of claim 4, further comprising:
   if a PCID of a transmission point is configured in the CSI-RS-based DRS measurement configuration, performing a CSI-RS-based DRS measurement for at least one cell included in the PCID of the transmission point.

6. The method of claim 4, further comprising:
   if a CSI-RS resource ID list is configured in the CSI-RS-based DRS measurement configuration, performing a CSI-RS-based DRS measurement for at least one cell included in the CSI-RS resource ID list.

7. A user equipment (UE) for performing a discovery reference signal (DRS) measurement or a common reference signal (CRS) measurement, the UE comprising:
   a memory;
   a transceiver; and
   a processor, connected with the memory and the transceiver, and configured to:
   control the transceiver to receive a CRS measurement configuration and a DRS measurement configuration for a measurement object frequency, from a network;
   if the DRS measurement configuration includes a physical cell identification (PCID) list for a CRS-based DRS measurement,
      perform the DRS measurement for at least one cell included in the PCID list, and
      perform the CRS measurement for at least one cell not included in the PCID list; and
   if the DRS measurement configuration does not include the PCID list for the CRS-based DRS measurement,
      perform the DRS measurement for all cells belonging to the measurement object frequency.

8. The UE of claim 7, wherein the DRS measurement is the CRS-based DRS measurement.

9. The UE of claim 7, wherein the CRS measurement is a CRS-based radio resource management (RRM) measurement.

10. The UE of claim 7, wherein the DRS measurement configuration further includes a channel state information (CSI)-reference signal (RS)-based (CSI-RS-based) DRS measurement configuration.

11. The UE of claim 10, wherein the processor is further configured to:
   if a PCID of a transmission point is configured in the CSI-RS-based DRS measurement configuration, perform a CSI-RS-based DRS measurement for at least one cell included in the PCID of the transmission point.

12. The UE of claim 10, wherein the processor is further configured to:
   if a CSI-RS resource ID list is configured in the CSI-RS-based DRS measurement configuration, perform a CSI-RS-based DRS measurement for at least one cell included in the CSI-RS resource ID list.

* * * * *